UNITED STATES PATENT OFFICE.

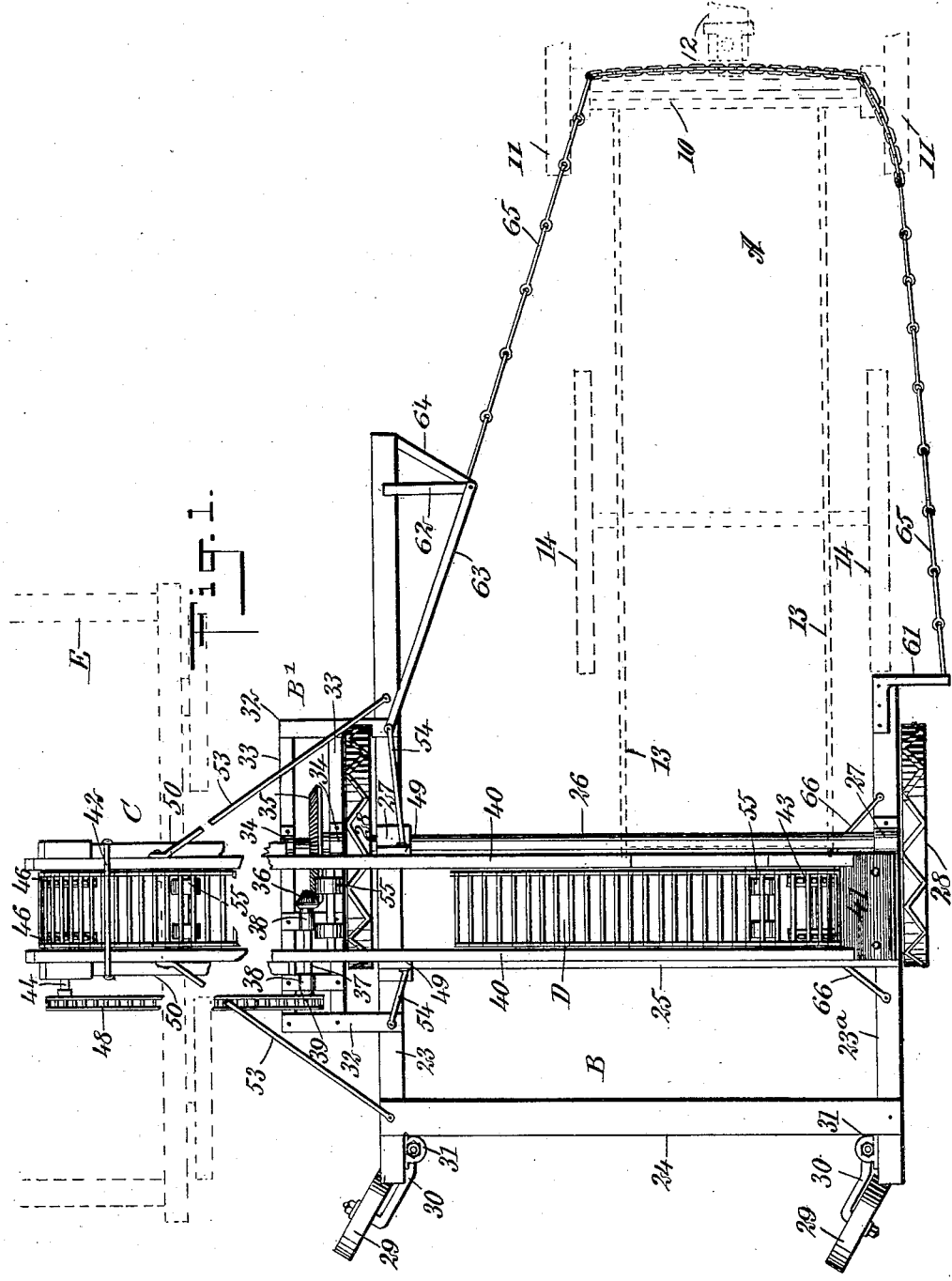

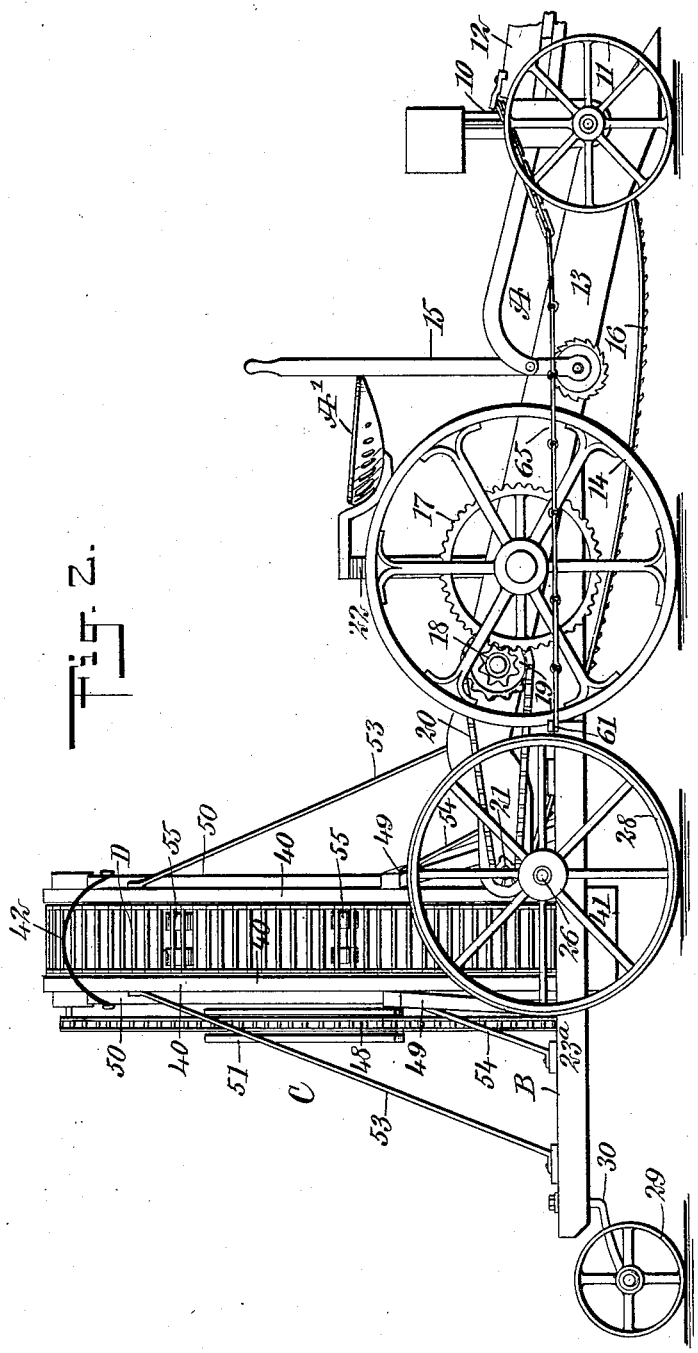

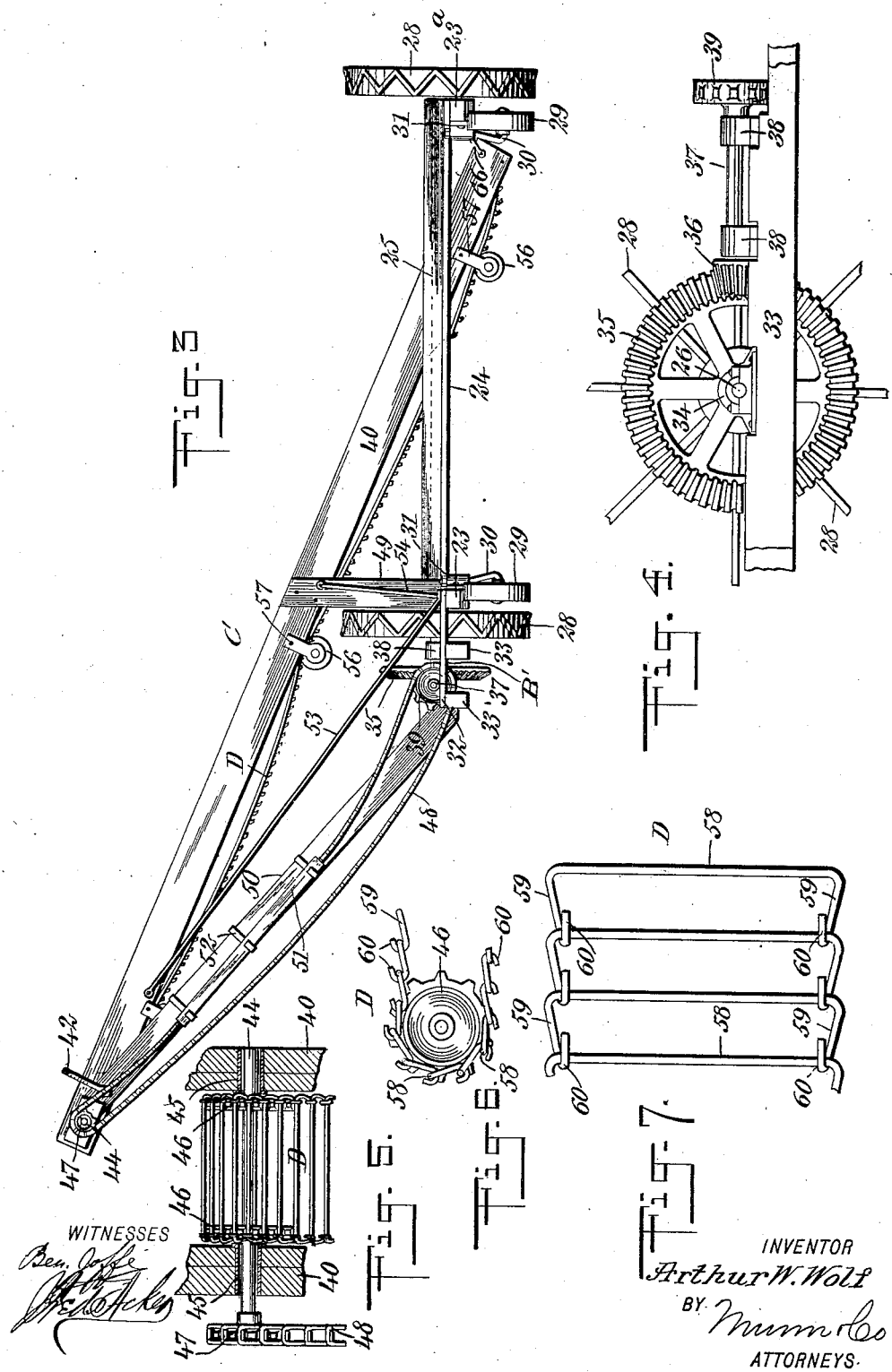

ARTHUR W. WOLF, OF HAMPTON, IOWA.

DETACHABLE POTATO AND VEGETABLE ELEVATOR.

No. 890,548.  Specification of Letters Patent.  Patented June 9, 1908.

Application filed June 29, 1907. Serial No. 381,520.

*To all whom it may concern:*

Be it known that I, ARTHUR W. WOLF, a citizen of the United States, and a resident of Hampton, in the county of Franklin and State of Iowa, have invented a new and useful Improvement in Detachable Potato and Vegetable Elevators, of which the following is a full, clear, and exact description.

The purpose of the invention is to provide a very simple, durable, and economic form of elevator, especially adapted for use in connection with any form of potato digger, but particularly what is known as the "Dowden potato digger," and to so construct the device that the potatoes or other vegetables are taken directly from the digger and elevated in a manner to deliver them into a wagon or other conveyance drawn or propelled beside the digger and kept beneath the upper end of the elevator.

It is a further purpose of the invention to provide a wheel supported elevator of the type described, that is readily detachable from and which is independent of the digger, and also to provide a draft connection between the elevator supporting frame and the digger, which connection is simple, readily applied and disconnected, and which will insure the elevator structure properly tracking the digger under all conditions of usage.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a plan view of the elevator, parts being broken away, the digger being diagrammatically shown in dotted lines and likewise the receptacle into which the vegetables are to be dumped; Fig. 2 is a side elevation of the elevator and the attached potato digger; Fig. 3 is a rear elevation of the elevator; Fig. 4 is a detail side elevation of the driving mechanism for the elevator, drawn upon a larger scale; Fig. 5 is a transverse section through the upper portion of the elevator, also drawn upon a larger scale; Fig. 6 is a side elevation of one of the upper sprocket wheels for the link conveyer employed; and Fig. 7 is an enlarged plan view of a portion of the link conveyer.

A represents a potato digger of any approved type, that shown being provided with an arched forward axle 10 carrying small forward wheels 11 and attached to a tongue 12, the said axle being made to support a body 13, and this body 13 is provided with rear larger supporting wheels 14, and the body is also provided with a lever 15 of any approved type for raising and lowering the digging end of the body. A conveyer, usually a chain conveyer 16, is located within the body, extending from its front to its rear, and this conveyer receives the potatoes or other vegetables as they are dug, and carries them to the rear portion of the body and delivers them to an elevator to be hereinafter described. The driving mechanism for this conveyer 16 as shown, consists of a gear 17 carried by the right-hand rear wheel 14, that meshes with a pinion 18 mounted upon the right-hand side of the body 13, said pinion 18 having an attached sprocket wheel 19 over which a driving belt 20 is passed, the said belt being likewise passed over a sprocket pinion 21 on the rear supporting shaft for the conveyer 16.

A' represents the driver's seat, which is supported by means of a suitable standard 22.

The frame B of the elevator is best shown in Fig. 1. It consists of parallel side sills 23 and 23$^a$, the left-hand side sill 23 extending further forward than does the right-hand side sill 23$^a$, so as to provide ample space in front of the latter side sill to receive the right-hand rear supporting wheel of the digger. The side sills 23 and 23$^a$ are connected at their rear by a cross bar 24 and are also connected by an intermediate cross bar 25, and forward of this intermediate cross bar 25, an axle 26 for the frame is mounted in suitable bearings 27 carried by the side sills 23 and 23$^a$. The axle 26 is provided with supporting wheels 28 loosely mounted thereon and located outside of the main frame B of the elevator. These wheels 28 have the customary ratchet connection with the axle 26, so that as the machine is drawn forward the ratchet connection between the wheels and the axle 26 will act to turn the axle, but when the machine is moved rearward the supporting wheels 28 turn loosely on said axle and the axle remains still. The main frame B is also supported by caster wheels 29, located at the rear ends of the side sills 23 and 23ᵃ. The spindles or shanks 30 for these caster wheels 29 are carried upward through bearings 31 secured preferably to the sills 23 and 23ᵃ at their rear end portions.

An extension B' of the main frame B, is provided at the left-hand side of the said main frame, and this extension consists usually of two end bars 32 that are attached to the left-hand side sill 23 and extend out from said sill at an angle thereto, and the said end bars 32 are connected by parallel longitudinal bars 33. The left-hand end of the axle 26 extends over the said extension frame B' and is journaled in suitable bearings 34 carried by the extension frame, as is best shown in Fig. 1. A bevel gear 35 is secured to the axle 26 between the longitudinal bars 33 of the extension frame, and this bevel gear 35 meshes with a bevel pinion 36 located on the forward end of a shaft 37 that extends longitudinally in direction of the rear of the said extension frame, being journaled in suitable bearings 38, as is shown in Figs. 1 and 4, and as particularly shown in Fig. 4, a sprocket wheel 39 is secured to the rear end of short line shaft 37.

The elevator C is located between the intermediate connecting bar 25 of the main frame and the axle 26, and is given an inclination from the right-hand side of the said main frame upward and beyond the left-hand side of the said frame, as is especially shown in Fig. 3. The body portion of this elevator consists of parallel beams 40 of suitable thickness, to which side boards may be added if the body of the elevator is to be quite deep, and these side beams 40 of the elevator are connected at their lower ends by a plate 41 that is attached to the upper face of the right-hand side sill 23ᵃ of the main frame, extending down below said sill, as is shown in Figs. 1 and 2, so that the upper edge of the elevator at its lower end is below the plane of the bottom of the said sill 23ᵃ to which it is attached, and the said side beams or timbers 40 for the elevator C are connected and braced at their upper ends by an arched brace bar 42.

A sprocket wheel 43 is suitably mounted in the lower end portion of the elevator body, and at the upper end portion thereof a shaft 44 is mounted to turn in suitable bushings 45 inserted in the side timbers of the elevator, as is shown in Fig. 5, and the rear end of the shaft 44 extends beyond the rear side of the body of the elevator. Between the side timbers of the elevator body two sprocket wheels 46 are secured to the shaft 44, and these sprocket wheels are of much greater diameter, preferably of twice the diameter, of the lower sprocket wheel 43, and another and smaller sprocket wheel 47 is secured to the rear end of the shaft 44, carrying an ordinary chain belt 48, which belt is likewise passed over the sprocket wheel 39 carried by the line shaft 37, so that the shaft 44 and sprocket wheels 46 carried thereby are revolved when the axle 26 is turned. The body of the elevator is supported about centrally between its ends by posts 49, that extend up from the left-hand side sill 23 of the main supporting frame B for the elevator, and braces 50 are secured to the outer side faces of the side timbers 40 of the body of the elevator, and these braces 50 are carried downward and have bearing on and are attached to the left-hand side portion of the extension frame B', as is best shown in Fig. 3. A guide 51 is provided for the upper stretch of the driving belt 48, and this guide 51, as is shown in Fig. 3, is supported by brackets 52. Other braces 53 likewise extend from the outer faces of the timbers 40 for the elevator down to the left-hand side sills of the main supporting frame B, while other metal braces 54 extend from the posts 49 down to the rear portion of the said main supporting frame B, as is shown in Figs. 1 and 3. Guide rollers 55 are journaled in pairs to the inner faces of the timbers 40 of the body of the elevator, as is shown in Fig. 1, and other guide rollers 56 also in pairs are located below the rollers 55, extending also below the bottom edges of the said timbers 40, as is shown in Fig. 3, being held in position by brackets 57 of any approved type.

The rollers 55 support the upper stretch of a link conveyer D, while the rollers 56 support the lower stretch of the said link conveyer, as is shown in Figs. 1 and 3. This link conveyer passes over the main sprocket wheel 43 of the elevator and over the upper sprocket wheel 46, as is shown in Figs. 1 and 5. The links of the conveyer D are of peculiar construction, as is best shown in Fig. 7, wherein it will be observed that each link is of substantially U-shape, being of sufficient length to extend nearly from one timber 40 of the elevator body or frame, to the other, and in forming a link, a bow member 58 is provided and end members 59, which are inclined at their free ends more or less in direction of each other, and each end member 59 terminates in a hook 60, and the hooks of one link receive the bow member of the next link, and as the chain moves the bow members 58 of the links are those that enter the spaces between the teeth of the carrying sprockets 43 and 46 for the conveyer.

The attachment between the elevator and the digger A is very quickly made. An arm 61 is made to extend out from the forward end of the right-hand side sill 23ᵃ of the elevator supporting frame B, the said arm 61 being at right angles to the said sill, and a similar arm 62 is made to extend from the forward portion of the left-hand sill 23 in the same direction as does the arm 61, the said arms 61 and 62 being practically draft arms, and the arm 62 is strengthened by braces 63 and 64. One end of a draft chain 65 is attached to the outer end of the right-hand arm 61, and the opposite end of the chain is attached to the left-hand draft arm 62, and the forward portion of the chain is passed, as is shown in Fig. 2 and indicated in Fig. 1, around the front of the forward axle 10 of the digger, and is connected by a hook, or equivalent means, to the rear end of the tongue 12.

In operation, the vegetables as they are dug, are received on the conveyer 16 of the digger, and the said conveyer deposits said vegetables on the conveyer D of the elevator at the lower portion of the latter. The vegetables are then carried up by the link conveyer D and by reason of the peculiar construction of this conveyer, the dirt is well sifted from the vegetables by the time they reach the upper end of the conveyer, from whence they fall into a wagon E, or other suitable receptacle drawn along or propelled at the left-hand side of the elevator beneath its upper end. The peculiar connection between the elevator and the digger enables an attachment between the two machines to be quickly and readily made, and also enables them to be as quickly and as readily separated, and furthermore, the said connection enables each of the two machines to be perfectly free in their motions, yet the elevator will always track the digger. The elevator in its entirety is very simple, economic, and is also exceedingly strong. The lower end portion of the elevator is usually supported by braces 66 attached to the timbers 40 and to the shorter sill 23ª of the supporting frame.

Having thus described my invention, I claim as new and desire to secure by Letters Patent,—

1. In an elevator for potatoes and other vegetables, a wheel supported base frame having an extension at one side, parallel timbers extending from one side of the base frame upward over and beyond the extension at the opposite side of the said frame, sprocket wheels mounted between the said timbers at the top and bottom portions thereof, a conveyer carried by the sprocket wheels, means for driving the supporting sprockets of the conveyer from the axle of the base frame, and a draft device at the forward end of the base frame.

2. In an elevating device for vegetables and the like, a wheel supported base frame having an open forward end and having one side sill extending further forward than the other, a draft device connected with the forward end portions of the side sills of the base frame, an elevator frame extending from a point below one side sill of the base frame upward and beyond the opposite side sill, a conveyer carried by the elevator frame, supporting sprocket wheels for the conveyer mounted in the elevator frame, and means for driving the supporting sprocket wheels by the forward movement of the wheel supported base frame.

3. In an elevating device for vegetables and the like, a base frame having an extension at one side, an axle in the base frame and extending over the extension, wheels on the axle, an elevator frame extending from a point below one side of the frame upward and beyond the extension at the opposite side of said frame, a conveyer carried by the elevator frame, a shaft mounted in the extension of the base frame and geared with the axle, and means for operating the conveyer from said shaft.

4. In an elevating device for vegetables, and the like, a wheel supported base frame, open at its forward end and having one side still extending further forward than the other, a draft arm extending at an angle outward from the forward end of the shorter side sill, a corresponding arm extending in the same direction and at the same angle from the forward portion of the longer side sill, a draft chain, the ends whereof are connected with the said arms, an elevator frame that extends from a point below the short side sill, upward and beyond the longer side sill, a conveyer for the elevator frame, and means driven from the axle of the base frame for driving the said conveyer.

5. In an elevating device for vegetables and the like, a base frame open at its forward end and having an extension at one side, an axle journaled in the base frame and extending over the extension thereof, supporting wheels carried by the axle, caster wheels located at the rear end of the said base frame, an elevator frame extending from a point below the one side of the frame upward and beyond the extension at the other side of said frame, sprocket wheels mounted in the said elevator frame, an endless belt passed over the said sprocket wheels, the sprocket wheels being at the top and at the bottom of the conveyer, a shaft for the said upper sprocket wheels, a longitudinal shaft mounted in the extension of the base frame and geared with the said axle, and a belt driven from said shaft, which belt is in driving connection with the shaft for the upper sprocket wheels.

6. The combination with a digging machine, of an elevator, the base frame whereof is wheel supported, one side sill of said frame extending further forward than the other, an arm extending out at right angles from the shorter end of the side sill, a corresponding arm extending in the same direction and at the same angle from the outer end portion of the longer sill, and a draft chain attached at its ends to the end portions of the said arm, which draft chain passes around and is connected with a forward portion of the digger, whereby the elevator and the digger are independent in lateral movement one of the other, and the base frame of the elevator accommodates the rear wheel of the digger, and whereby also the elevator will track the digger.

In testimony whereof I have signed my name to this specification in the presence of two subscribing witnesses.

ARTHUR W. WOLF.

Witnesses:
JNO. M. HEMINGWAY,
D. C. WOLF.